United States Patent

[11] 3,611,895

| [72] | Inventors | Joachim von Albedyll<br>Augsburg;<br>Karl Wagner, Ottobrunn; Hans-Peter<br>Huber, Munich, all of Germany |
|---|---|---|
| [21] | Appl. No. | 870,020 |
| [22] | Filed | Oct. 28, 1969 |
| [45] | Patented | Oct. 12, 1971 |
| [73] | Assignee | Agfa-Gevaert Aktiengesellschaft<br>Leverkusen, Germany |
| [32] | Priority | Oct. 31, 1968 |
| [33] | | Germany |
| [31] | | P 18 06 487.4 |

[54] PHOTOGRAPHIC CAMERA FOR USE IN DAYLIGHT AND ARTIFICIAL LIGHT
7 Claims, 2 Drawing Figs.

[52] U.S. Cl. .......... 95/10 C, 95/64 A
[51] Int. Cl. .......... G03b 7/08, G03b 7/16
[50] Field of Search .......... 95/10 C, 64 R, 64 A

[56] References Cited
UNITED STATES PATENTS

| 3,205,795 | 9/1965 | Grey | 95/10 C |
|---|---|---|---|
| 3,344,724 | 10/1967 | Taguchi | 95/10 C |
| 3,393,619 | 7/1968 | Albedyll et al. | 95/64 R X |
| 3,426,661 | 2/1969 | Wick et al. | 95/10 C |
| 3,464,332 | 9/1969 | Davison et al. | 95/10 C |
| 3,509,806 | 5/1970 | Kiper | 95/10 C |

Primary Examiner—Joseph F. Peters
Attorney—Michael S. Striker

ABSTRACT: A photographic camera wherein the aperture size is a function of scene brightness and of the position of focusing means when the exposure is made in artificial light. Changes in the position of the focusing means effect changes in sensitivity of the circuit which includes a photosensitive receiver and directly controls the diaphragm. The sensitivity of the circuit is changed by changing the resistance of a variable resistor which is connectable in parallel with the receiver or by changing the amount of scene light which reaches the receiver in response to changes in the position of the focusing means.

PATENTED OCT 12 1971  3,611,895

INVENTOR.
JOACHIM v. ALBEDYLL
KARL WAGNER
HANS-PETER HUBER
BY
Michael Striker
Attorney

PHOTOGRAPHIC CAMERA FOR USE IN DAYLIGHT AND ARTIFICIAL LIGHT

BACKGROUND OF THE INVENTION

The present invention relates to photographic apparatus in general, and more particularly to improvements in photographic cameras which can be used to make exposures in daylight as well as in artificial light by using built-in or separable sources of artificial light. Still more particularly, the invention relates to improvements in cameras for use in daylight or artificial light wherein the exposure control includes focusing means which is movable between several positions to take into consideration the selected distance from the subject when the camera is used to make one or more exposures with artificial illumination of the subject.

Cameras which are used for making exposures in artificial light normally include an exposure control which can adjust the shutter and/or the diaphragm as a function of the guide number of the selected source of artificial light. In many instances, the exposure control is automatically adjusted in response to attachment of the light source or in response to placing of an element of such light source into a predetermined operative position. This spares the user tedious calculations prior to making of an exposure with artificial illumination of the subject.

A drawback of presently known photographic cameras of the just described character is that the guide number of the light source is an average number, i.e., a number which is selected on the basis of the assumption that the area surrounding the subject reflects an average amount of artificial light. However, in actual practice, the so-called space factor or background factor often varies within a wide range and is likely to affect the quality of exposures which are made in artificial light if the value of such factor is well above or well below the assumed average value.

For example, if the subject to be photographed in artificial light is located in front of a relatively light background which reflects large amounts of light, the corresponding film frame is likely to be overexposed because the subject is illuminated by light issuing from an electronic flash or a flashbulb as well as by light which is reflected by the light background. This is often the case when the exposure is made indoors.

On the other hand, when the photographic camera is used to make one or more exposures with artificial illumination of the subject, and the subject is located outdoors, the reflection of artificial light from the background is practically nil so that the corresponding film frame is likely to be underexposed.

In conventional photographic cameras wherein the exposure control includes a photosensitive receiver which influences the exposure in daylight as well as in artificial light, the receiver is also likely to cause overexposure or underexposure of the important part or parts of a picture. For example, if the background of the subject is very light, the receiver is likely to select an aperture size which is too small and/or an exposure time which is too short because the receiver reacts to an average brightness including the brightness of the subject plus the brightness of the light background so that the exposure of the important part or parts of the picture is insufficient. If the background is too dark, the photosensitive receiver is likely to select an aperture size which is too large and/or an exposure time which is too long so that the important part or parts of the picture are overexposed.

SUMMARY OF THE INVENTION

An object of the invention is to provide a photographic camera which is capable of compensating for different lighting conditions when the exposures are made in artificial light.

Another object of the invention is to provide an exposure control wherein the diaphragm and/or the shutter is adjusted during an exposure in artificial light in such a way that the adjustment is a function of the so-called space factor.

A further object of the invention is to provide a novel electric circuit for the aforementioned exposure control and to design the circuit in such a way that the characteristics of the background of the subject are properly considered when the exposure is made in artificial light.

The invention is embodied in a photographic camera for use in daylight and artificial light, and more particularly in the provision of an exposure control which is installed in such camera. The exposure control comprises focusing means movable between a plurality of positions each of which is indicative of a different distance from the subject, an electric circuit of variable sensitivity which includes photosensitive receiver means exposed to scene light, adjustable exposure value determining means (e.g., an adjustable diaphragm) arranged to determine exposure values as a function of the sensitivity of the circuit, and adjusting means for regulating the sensitivity of the circuit as a function of the position of the focusing means when the camera is used to make exposures in artificial light.

The adjusting means may comprise variable resistor means which is connectable in parallel with the receiver means and whose resistance is varied in response to changes in the position of the focusing means, or masking means movable by the focusing means to thereby vary the amounts of scene light reaching the receiver means.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
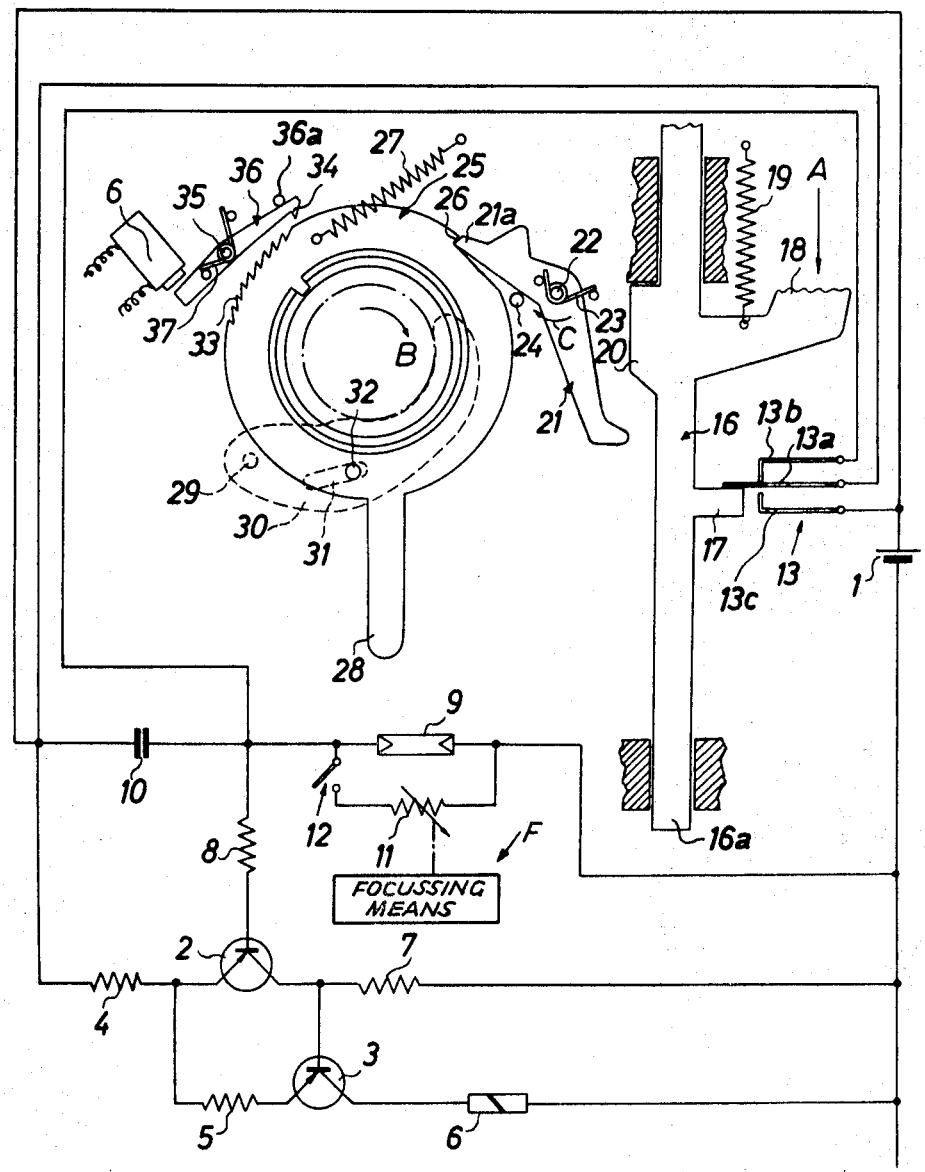
FIG. 1 is a fragmentary diagrammatic partly sectional view of a still camera having an exposure control which embodies one form of the invention.

The camera which is shown in FIG. 1 comprises an exposure control including a diaphragm whose aperture size can be selected as a function of scene brightness, not only when the camera is used in daylight but also during exposures in artificial light, e.g., with an electronic flash or with flashbulbs, not shown. The electric circuit of the exposure control comprises a battery 1 or another suitable energy source and a switching circuit including two transistors 2 and 3. The emitter of the transistor 2 is connected with a fixed resistor 4 and is also connected with the emitter of the transistor 3 through the intermediary of a fixed resistor 5. The collector of the transistor 3 is connected with an electromagnet 6 (shown twice in FIG. 1) which determines the aperture size as a function of scene brightness during operation in daylight and as a function of scene brightness as well as a function of the distance from the subject when the camera is used to make an exposure in artificial light. The electromagnet 6 is in series with the battery 1. The base-collector circuit of the transistor 3 includes a further fixed resistor 7. The base of the transistor 2 is connected to a tap between a photosensitive receiver 9 and a capacitor 10. The parts 9 and 10 constitute a voltage divider. The collector of the transistor 2 is further connected with the base of the transistor 3. The connection between the voltage divider and the base of the transistor 2 includes a fixed resistor 8. Though the exposure control in the camera of FIG. 1 is designed to determine the aperture size, it can also serve to determine the exposure time, either instead of or in addition to determining the aperture size.

The photosensitive receiver 9 is a resistor which is in parallel with a variable resistor 11. A switch 12 which is closed when the camera is to be used for making exposures in artificial light serves to connect the variable resistor 11 into the circuit of the exposure control. The movable part of the variable resistor 11 is coupled to a schematically indicated focusing means F which is movable between several positions with reference to a scale (not shown) indicating the distances from the subject. The circuit further includes a switchover device, here shown as a two-way switch 13 which normally closes the capacitor 10 and is actuatable to complete that part of the electric circuit which includes the receiver 9 and transistors 2, 3.

The means for actuating the switch 13 includes a reciprocable camera release member 16 having an extension 17 which normally maintains the movable contact 13a of the switch 13 in engagement with a first fixed contact 13b to thus close the capacitor 10. When the knob 18 of the release 16 is depressed in the direction indicated by the arrow A, the extension 17 permits the movable contact 13a to engage the second fixed contact 13c of the switch 13. A strong helical return spring 19 tends to maintain the release 16 in the illustrated idle position.

The release 16 further includes a second extension 20 which is a cam and cooperates with a two-armed blocking lever 21 for the ring-shaped turnable setting member 25 of the diaphragm. The lever 21 is mounted on a pivot pin 22 and is stressed by a torsion spring 23 which tends to maintain it in abutment with a fixed stop 24. When the setting member 25 assumes the illustrated cocked position, its shoulder 26 engages with the pallet 21a of the blocking lever 21 whereby the latter insures that the setting member 25 remains in cocked position while the release 16 dwells in the illustrated idle position. A spring 27 is connected to the housing of the camera and to the setting member 25 to bias the latter toward uncocked position (arrow B). The means for cocking the setting member 25 includes an arm 28 which can be displaced by hand or automatically in response to transport of the film. The diaphragm further includes blades 30 (only one shown for the sake of clarity) which are pivotable on pins 29 and have slots 31 receiving pins 32 provided on the setting member 25.

A portion of the periphery of the setting member 25 is toothed or serrated, as at 33, and is adjacent to the tooth 34 of a two-armed lever 36 constituting the armature of the electromagnet 6. When the latter is deenergized, the armature 36 is biased by a torsion spring 37 against a fixed stop 36a to assume the illustrated inoperative position. This armature is pivotable on a fixed pin 35.

The operation:

To make an exposure in daylight, the user of the camera shown in FIG. 1 opens the switch 12 (this switch can be closed automatically in response to attachment of a multiple flashbulb holder or an electronic flash) and depresses the knob 18 of the release 16 in the direction indicated by the arrow A to stress the return spring 19. The extension 17 of the release 16 moves the contact 13a of the switch 13 away from the contact 13b and into engagement with the fixed contact 13c. A current then flows through the transistor 2 but the transistor 3 blocks the flow of current so that the electromagnet 6 remains deenergized. The rate at which the capacitor 10 is charged depends on the resistance of the receiver 9, i.e., on the intensity of scene light. When the capacitor 10 is charged to such an extent that it causes the transistor 3 to conduct current and to energize the electromagnet 6 (with a certain delay following engagement between the contacts 13a, 13c of the switch 13), the setting member 25 has completed an angular movement whose magnitude is a function of scene brightness. As explained above, the spring 27 is free to turn the setting member 25 in the direction indicated by arrow B as soon as the cam 20 of the release 16 disengages the pallet 21a of the blocking lever 21 from the shoulder 26. When the electromagnet 6 is energized, it attracts the adjoining arm of the armature 36 so that the tooth 34 is moved into engagement with the adjacent tooth of the setting member 25 to hold the latter against further rotation in a clockwise direction, as viewed in FIG. 1. The direction in which the blocking lever 21 is turned by the cam 20 to be disengaged from the shoulder 26 is indicated by the arrow C.

The transistor 3 begins to conduct current when the transistor 2 blocks the flow of current. The shutter (not shown) is released by the tip 16a of the release 16 when the latter reaches its lower end position.

The spring 19 automatically returns the release 16 to the illustrated idle position when the user removes his or her finger from the knob 18. The movable contact 13a of the switch 13 then returns into engagement with the fixed contact 13b to close the capacitor 10 and to open the circuit of the transistors 2, 3. The setting member 25 is thereupon cocked by way of the arm 28 and the camera is ready to make a further exposure as soon as the film is transported by the length of a frame. The spring 27 stores energy in response to cocking of the setting member 25 and the electromagnet 6 is deenergized in response to disengagement of the contact 13a from the contact 13c. The torsion spring 23 causes the pallet 21a to reengage the shoulder 26 as soon as the setting member 25 reassumes the illustrated cocked position.

To make an exposure with artificial illumination of the subject, the user closes the switch 12 to connect the variable resistor 11 in parallel with the photosensitive receiver 9. Thus, the time required for charging of the capacitor 10 is then a function of scene brightness (detected by the receiver 9) as well as a function of the resistance of the resistor 11 which is adjusted by the focusing means F. This prevents improper exposure of film because the receiver 9 determines the brightness of light which is reflected on the scene and/or the surrounding area and the variable resistor 11 effects adjustments which are needed to account for the selected distance from the subject (or more accurately stated, for the selected position of the movable element of the focusing means F). For example, if the background of the scene which is illuminated by artificial light is relatively dark, the receiver 9 (in the absence of the adjustable resistor 11) would cause the exposure control to cause the making of an overexposed picture because the resistance of the receiver 9 would be a function of the combined brightness of the subject and of its background. If the resistor 11 were used without the receiver 9, it would unduly delay energization of the electromagnet 6 and would cause underexposure of the picture. Thus, since the receiver 9 tends to cause the making of an overexposed picture and the resistor 11 tends to cause the making of an underexposed picture, the result is a compromise, i.e., a properly or substantially properly exposed film frame. Otherwise stated, the receiver 9 influences the exposure control in a direction to overexpose and the resistor 11 influences the exposure control in a direction to underexpose. The final result is a satisfactory exposure which is invariably better than one without the part 9 or 11.

If the exposure in artificial light is to be made of a subject whose background reflects too much light onto the receiver 9, the latter tends to influence the exposure control in a direction to overexpose the corresponding film frame. Thus, if the receiver 9 were the only element which would influence the exposure control under such circumstances, the exposure would be unsatisfactory because the diaphragm would admit too little light (i.e., the electromagnet 6 would be energized with an excessive delay following depression of the knob 18). If the variable resistor 11 were used alone (i.e., without the receiver 9), the corresponding film frame would be overexposed because the time required for charging of the capacitor 10 would depend exclusively on the setting of the focusing means F. Thus, here again, the sensitivity of the circuit is adjusted in a direction to improve the exposure by determining the time required for charging of the capacitor 10 (and hence the time during which the setting member 25 can turn under the action of the spring 27) as a function of the resistance of the receiver 9 and the resistance of the resistor 11. The latter constitutes a means for adjusting the circuit including the receiver 9 and the capacitor 10 as a function of the position of the focusing means F. The diaphragm including the setting member 25 and the blades 30 constitutes an adjustable exposure value determining means which is arranged to determine exposure values (aperture sizes) as a function of the sensitivity of the circuit including the receiver 9 and the capacitor 10.

Figure 2:
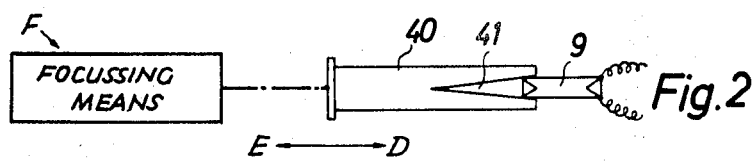
FIG. 2 illustrates a portion of a modified exposure control.

The variable resistor 11 can be replaced by adjusting means in the form of an opaque mask which is movable relative to the receiver 9 to thereby change the amounts of scene light which can reach the receiver as a function of the distance from the subject. This is shown in FIG. 2 wherein a mask 40, which is reciprocable in directions indicated by a double-headed arrow D-E, includes a substantially V-shaped (tapering) light-admitting cutout or notch 41 and is movable relative to the receiver 9. The mask 40 is operatively connected with the focusing means F. Thus, the receiver 9 can effect the adjustment of the diaphragm (not shown in FIG. 2) as a function of scene brightness as well as a function of the distance from the subject. This again insures that the film frames are properly exposed even if the background of the subject reflects too little or too much artificial light.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a photographic camera for use in daylight and artificial light, an exposure control comprising focusing means movable between a plurality of positions each indicative of a different distance from the subject; an electric circuit including photosensitive receiver means exposed to scene light and arranged to change its condition in dependency on the intensity and amounts of such light; adjustable exposure value determining means arranged to determine exposure values as a function of the condition of said receiver means; and adjusting means for regulating the condition of said receiver means as a function of the position of said focusing means when the camera is used to make exposures in artificial light, said adjusting means comprising masking means movable by said focusing means to thereby vary the amounts of light reaching said receiver means.

2. An exposure control as defined in claim 1, wherein said masking means consists of opaque material and has a tapering light-admitting notch which is movable with reference to said receiver means.

3. An exposure control as defined in claim 1, wherein said circuit further includes capacitor means in series with said receiver means and an energy source in series with said receiver means, and further comprising release means movable between first and second positions and switch means for respectively opening and completing said circuit in the first and second positions of said release means.

4. An exposure control as defined in claim 1, wherein said exposure value determining means includes diaphragm means and wherein said circuit further comprises electromagnet means energizable upon completion of said circuit with a delay which is a function of scene brightness and of the position of said masking means to thereby determine the aperture size defined by said diaphragm means.

5. An exposure control as defined in claim 4, wherein said circuit further comprises capacitor means chargeable at a rate which is a function of the condition of said receiver means and of the position of said masking means and transistor means arranged to conduct current and to thereby effect energization of said electromagnet means when said capacitor means is charged to a predetermined extent.

6. An exposure control as defined in claim 1, wherein said receiver means comprises a photosensitive resistor.

7. An exposure control as defined in claim 1, wherein said focusing means is movable by hand.